(12) United States Patent
Collier et al.

(10) Patent No.: US 7,734,716 B2
(45) Date of Patent: Jun. 8, 2010

(54) METHODS AND SYSTEMS FOR MANAGEMENT AND CONTROL OF AN AUTOMATION CONTROL MODULE

(75) Inventors: David Collier, Charlottesville, VA (US);
Ferrell Mercer, Earlysville, VA (US);
Bill Hannold, Charlottesville, VA (US);
Jason Kandingo, Palmyra, VA (US);
Brad Bolfing, Charlottesville, VA (US);
Bob Newman, Barboursville, VA (US);
Carrie Brownhill, Earlysville, VA (US);
Dave Hietanen, Charlottesville, VA (US); Robert Chambers, Barboursville, VA (US); David Elliott, Ruckersville, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 1018 days.

(21) Appl. No.: 10/056,596

(22) Filed: Jan. 24, 2002

(65) Prior Publication Data
US 2003/0140094 A1 Jul. 24, 2003

(51) Int. Cl.
*G06F 15/16* (2006.01)
*G05B 19/18* (2006.01)
*G05B 15/00* (2006.01)

(52) U.S. Cl. .................. 709/217; 709/218; 709/219; 709/230; 700/65; 700/83

(58) Field of Classification Search .......... 709/217–219, 709/230; 700/65, 83
See application file for complete search history.

(56) References Cited

U.S. PATENT DOCUMENTS

| | | | |
|---|---|---|---|
| 5,038,318 A | 8/1991 | Roseman | |
| 5,307,463 A | 4/1994 | Hyatt et al. | |
| 5,797,037 A | 8/1998 | Ecclesine | |
| 5,801,942 A | 9/1998 | Nixon et al. | |
| 5,805,442 A | 9/1998 | Crater et al. | |
| 5,887,165 A | 3/1999 | Martel et al. | |
| 5,978,578 A | 11/1999 | Azarya et al. | |
| 6,038,486 A | 3/2000 | Saitoh et al. | |
| 6,061,603 A * | 5/2000 | Papadopoulos et al. | 700/83 |
| 6,151,625 A | 11/2000 | Swales et al. | |
| 6,169,928 B1 | 1/2001 | Olson et al. | |
| 6,263,487 B1 | 7/2001 | Stripf et al. | |
| 6,282,454 B1 | 8/2001 | Papadopoulos et al. | |
| 6,598,083 B1 * | 7/2003 | Remer et al. | 709/229 |
| 6,629,127 B1 * | 9/2003 | Deen et al. | 709/203 |
| 6,668,279 B1 * | 12/2003 | Curtis | 709/218 |
| 6,684,257 B1 * | 1/2004 | Camut et al. | 709/246 |
| 6,725,104 B2 * | 4/2004 | Lo et al. | 700/65 |
| 6,826,594 B1 * | 11/2004 | Pettersen | 709/203 |
| 7,004,402 B2 * | 2/2006 | Borders et al. | 239/69 |
| 7,013,340 B1 * | 3/2006 | Burd et al. | 709/229 |
| 7,130,701 B1 * | 10/2006 | Wischinski | 700/65 |
| 2003/0014160 A1 * | 1/2003 | Nordquist et al. | 700/275 |
| 2003/0083770 A1 * | 5/2003 | Williamson | 700/117 |

* cited by examiner

*Primary Examiner*—Moustafa M Meky
*Assistant Examiner*—Avi Gold
(74) *Attorney, Agent, or Firm*—Mark A. Conklin, Esq.; Armstrong Teasdale LLP (57) ABSTRACT

A web-enabled automation control module (ACM) includes an ACM central processing unit (CPU) and a web and file transfer system electrically connected to the ACM CPU, and embedded within the ACM. The system is configured to process hypertext transfer protocol (HTTP) requests from a network.

38 Claims, 8 Drawing Sheets

General Syntax: <!-- gef:funcname attribute1=value1 attribute2=value2 ... -->

FIG. 5

<!--gef:getRefVal table=%R start_add=#T1+9 length=1-->

```
<html>

<head>
<title>CPU374 PLC Mode </title>
</head>
<body>
<script>
<1-- hide me
var PLC_mode = "<1-- gef:plcMode -->"

// stop hiding -->
</script>
<table border="1" >
   <tr>
      <td >CPU374 PLC Mode Display</td>
    </tr>
    <tr>
       <td >PLC Mode</td>
<script>
<1-- hide me
     document.write("<td>");
     document.write(PLC_mode);
     document.write("</td>");

// stop hiding -->
</script>
   </tr></table></body></html>
```

FIG. 10

METHODS AND SYSTEMS FOR MANAGEMENT AND CONTROL OF AN AUTOMATION CONTROL MODULE

BACKGROUND OF THE INVENTION

This invention relates generally to automation control modules (ACMs) and more particularly to management and control of ACMs.

Known ACM systems access ACM data using an input/output (I/O) module connected to a backplane on the ACM. The I/O module increases the cost of the system and uses additional space in the ACM system cabinet. In addition, if the backplane includes a plurality of modules, the I/O module may respond more slowly.

Known web-enabled ACM systems also provide pre-defined web pages that contain ACM data in a format determined by the manufacturer. Predefined web pages are inflexible and may be intolerable to many users. Furthermore, known ACM systems that include a web server use the ACM's central processing unit (CPU) to run the web server and the transmission control protocol (TCP)/internet protocol (IP) stack, thereby degrading performance of the CPU.

BRIEF DESCRIPTION OF THE INVENTION

In one aspect, a web-enabled automation control module (ACM) is provided that includes an ACM central processing unit (CPU) and a web and file transfer system electrically connected to the ACM CPU, and embedded within the ACM. The system is configured to process hypertext transfer protocol (HTTP) requests from a network.

In another aspect, an automation control module (ACM) system is provided that includes an ACM, a network, a web-enabled computer electrically connected to the network, and a web and file transfer subsystem electrically connected to the ACM and the network. The subsystem is configured to store at least one user-defined web page file.

In yet another aspect, a method is provided for management and control of an automation control module (ACM). The ACM includes an ACM central processing unit (CPU) and a web and file transfer system embedded within the ACM. The web and file transfer system is electrically connected to a network. The method includes electrically connecting the web and file transfer system to the ACM CPU, and processing hypertext transfer protocol (HTTP) requests from the network using the web and file transfer subsystem.

In a further aspect, a method is provided for management and control of an automation control module (ACM) using an ACM system. The ACM system includes an ACM, a network, a web-enabled computer electrically connected to the ACM, and a web and file transfer subsystem. The method includes electrically connecting the web and file transfer subsystem to the ACM and the network, and storing at least one user-defined web page.

DETAILED DESCRIPTION OF THE INVENTION

Set forth below are descriptions of embodiments of methods and systems for control and management of an automation control module (ACM). The methods and systems facilitate viewing and controlling ACM data through standard networks, protocols, and browsers, developing and downloading user-defined web pages that include ACM data, and controlling the access level to the ACM and user-defined web pages.

The methods and systems are not limited to the specific embodiments described herein. In addition, components of each system and steps of each method can be practiced independent and separate from other components and steps described herein. Each component and step can also be used in combination with other components and steps.

As used herein, the term ACM refers to any device used to control the automation of an activity, including but not limited to PLCs, computer numeric controls (CNCs), motion control products, home automation products, and commercial automation products, for example controls for automated teller machines or car wash systems. As used herein, ACM data includes different types of data within an ACM system 10 that control operation of ACM system 10. ACM data includes, but is not limited to, user logic programs, user program memory, ACM status and statistics, ACM faults, setting ACM operating states, setting privilege levels, and any other useful ACM information.

Figure 1:
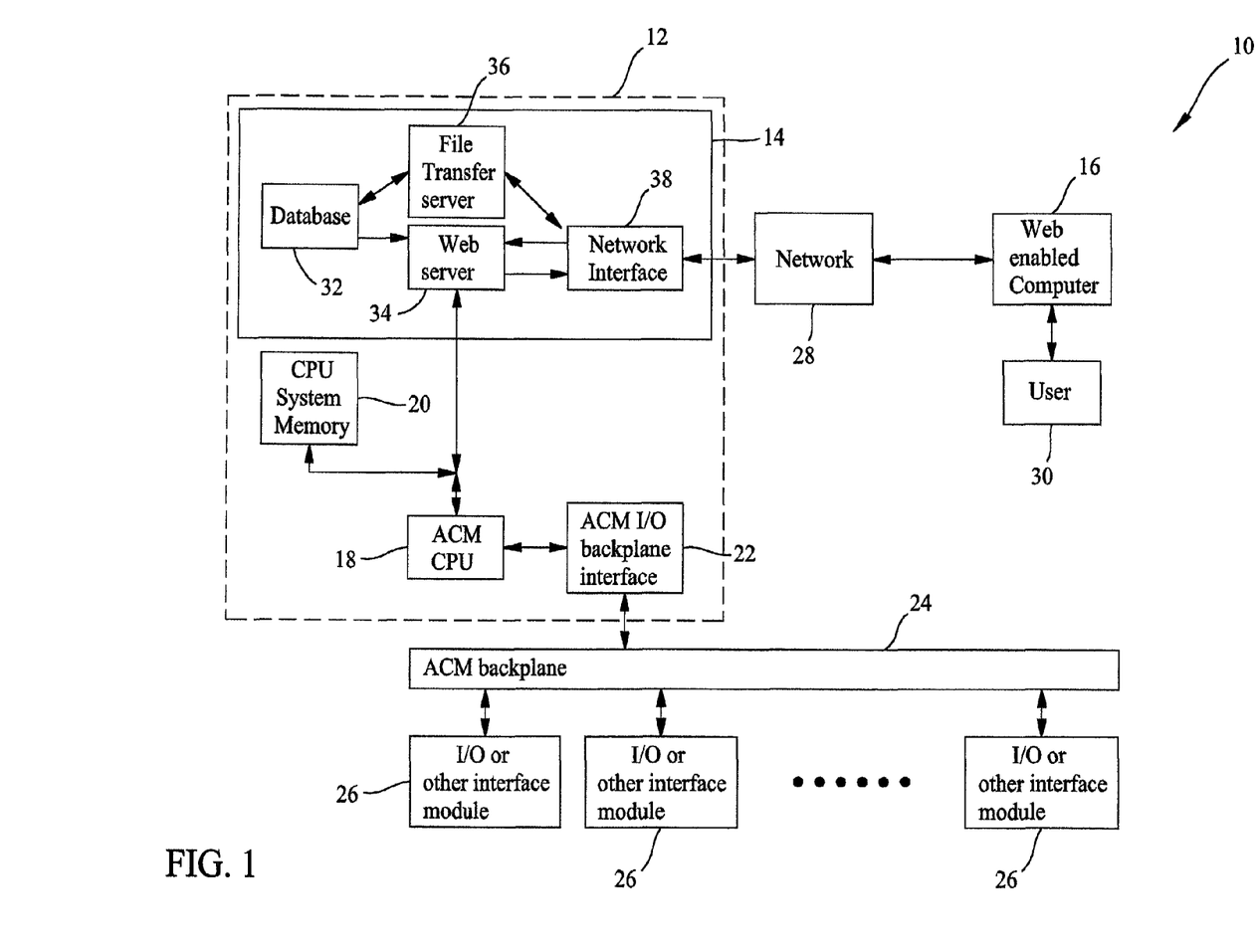
FIG. 1 is a block diagram illustrating one embodiment of an ACM system of the present invention.

FIG. 1 illustrates, in block diagram form, hardware architectures that can be utilized in conjunction with an ACM management and control system. The system can be implemented on many different platforms and utilize many different architectures. The architectures illustrated in FIG. 1 are exemplary only.

FIG. 1 is a block diagram illustrating one embodiment of ACM system 10. System 10 includes an eWeb ACM 12, a web and file transfer subsystem 14, and a web-enabled computer 16. EWeb ACM 12 includes an ACM CPU 18 that carries out ACM functions, for example user logic and function block executions, input/output (I/O) scanning, and communications to other devices. ACM CPU 18 includes a CPU system memory 20 electrically connected to CPU 18 and, in one embodiment, contains both the operating system (not shown) for ACM CPU 18 and a user's program and data. In one embodiment, an ACM I/O backplane interface 22 is connected to ACM CPU 18, and provides an interface between ACM CPU 18 and an ACM backplane 24 connected to interface 22. ACM backplane 24 provides a physical and electrical means for connecting various I/O or other input modules 26, for example communications or motion modules, into eWeb ACM 12. ACM backplane 24 facilitates the exchange of data between modules 26 and ACM CPU 18. In one embodiment, one or more modules 26 provide an interface for real world inputs (not shown), such as limit or proximity switch status, position of an object, temperature, or pressure, to ACM CPU 18 as parameters for logic or function block execution. In another embodiment, one or more modules 26 provide an interface to real world outputs (not shown) as commanded by ACM CPU 18 to control output devices (not shown), such as actuators, contactors, or solenoids.

Web-enabled computer 16 is electrically connected to a network 28. Network 28 includes the physical medium and intermediate devices (not shown), such as routers, and switches, that connect computer 16 to eWeb ACM 12. In one embodiment, network 28 is a wide area network (WAN), such as the Internet. In an alternative embodiment, network 28 is a local area network (LAN), such as an Intranet. A user 30 accesses, such as dialing into, or directly logging onto, an Intranet or the Internet to gain access to eWeb ACM 12. In one embodiment, computer 16 includes a web browser, and eWeb ACM 12 is accessible to computer 16 via the Internet. Computer 16 is interconnected to the Internet through many interfaces including a different network (not shown), such as a WAN or a LAN, dial in connections, cable modems and special high-speed ISDN lines. Computer 16 is any device capable of interconnecting to the Internet, including a web-based telephone or other web-based connectable equipment.

Computer 16 displays PLC data on at least one web page (not shown), and retrieves web page files (not shown) stored on a web page file database 32 embedded within web and file transfer subsystem 14. Web page files are text files that may contain hypertext markup language (HTML), Javascript, and/or references to other files, such as image files to be displayed with the web page or Java Applets. In another embodiment, web page files include ACM tag functions that reference ACM data stored in CPU system memory 20. The tag facilitates the exchange of data between ACM CPU 18 and a web server 34 embedded within web and file transfer subsystem 14. Further, the tag provides a generic mechanism for user 30 to display and/or control ACM data with a standard browser. In one embodiment, computer 16 includes web authoring tools and/or text editors that, along with user input, are utilized to create and modify web page files.

Users 30 include at least one person who views and/or controls ACM data from computer 16. In one embodiment, users 30 include a person who created a web page file. Web and file transfer subsystem 14 is electrically connected to ACM CPU 18, CPU system memory 20, and network 28. Subsystem 14 is shown in FIG. 1 to be embedded within eWeb ACM 12. In an alternative embodiment, subsystem 14 is contained in a separate module connected to backplane 24. Web and file transfer subsystem 14 includes web page file database 32, web server 34, a file transfer server 36, and a network interface 38 that provides the lower level protocols (TCP/IP) and physical hardware connections to network 28. File transfer server 36 is electrically connected to web page file database 32 and network interface 38, and transfers web page files and associated elements between web page file database 32 and computer 16. File transfer server 36 facilitates downloading customizable user 30 defined web pages to eWeb ACM 12 as described below. In one embodiment, file transfer server 36 is a file transfer protocol server.

Web server 34 is electrically connected to web page file database 32, network interface 38, and ACM CPU 18. Web server 34 receives and processes hypertext transfer protocol (HTTP) requests to send web pages to computer 16 and, based upon the requests, sends the requested web page to computer 16. If the requested web page includes a tag function, web server 34 parses and executes the tag function and either embeds ACM data within a web page file thereby displaying the web page on a browser on computer 16, or transmits ACM data to ACM CPU 18. In one embodiment, web server 34 transfers ACM data to ACM CPU 18 to control operation of eWeb ACM 12.

In one embodiment, user 30 must enter a valid user name and valid user password to access eWeb ACM 12 and web and file transfer subsystem 14. The user name and user password correspond to a user profile stored in web page file database 32. User 30 configures the number of web and file transfer TCP connections (not shown) using computer 16. A value of zero allows user 30 to disable the web and file transfer TCP connections.

Figure 2:
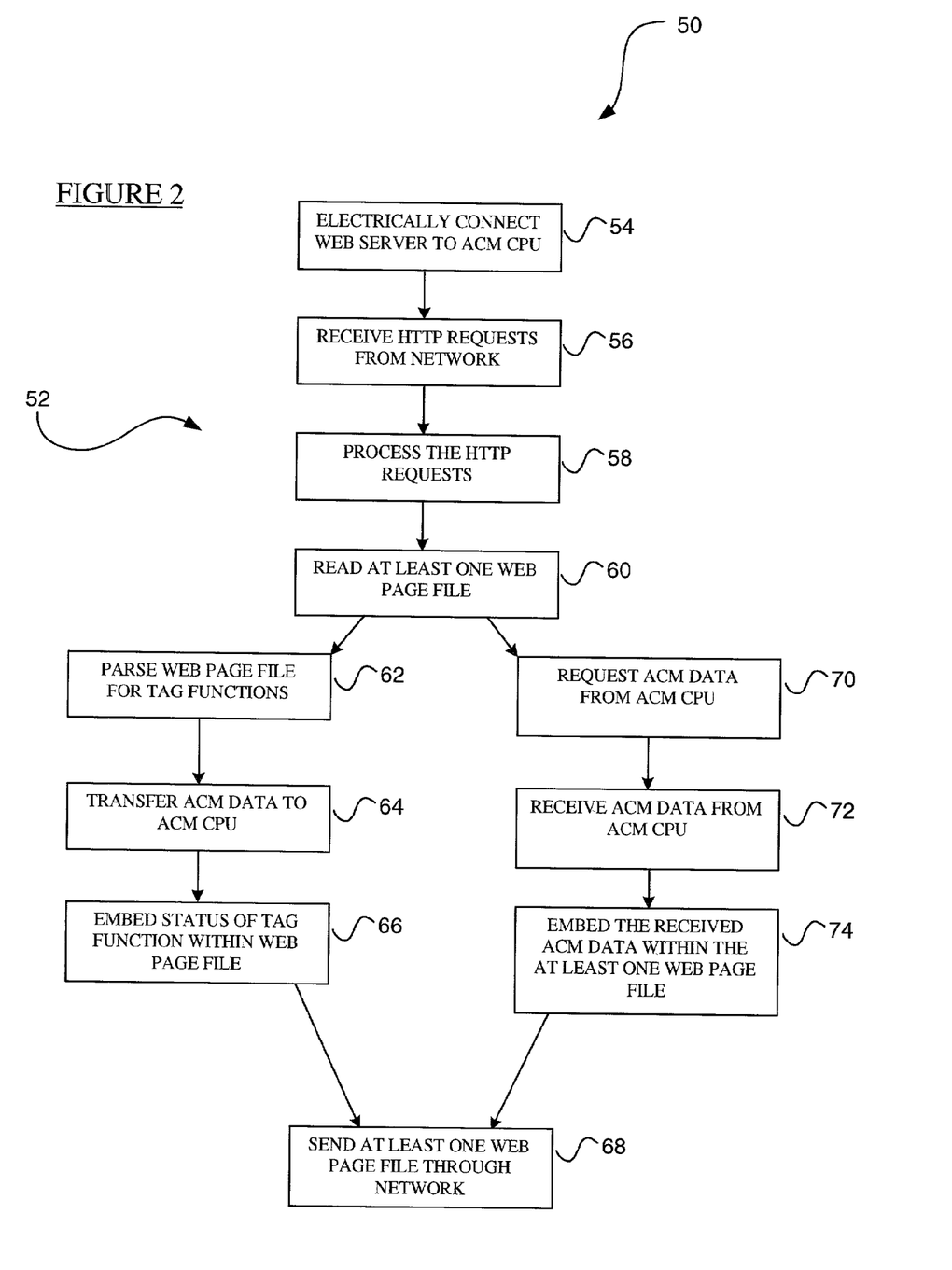
FIG. 2 is a flow chart illustrating one embodiment of a method for management and control of an automation control module using an ACM system.

FIG. 2 is a flow chart 50 illustrating a method 52 for management and control of eWeb ACM 12 (shown in FIG. 1). Method 52 includes electrically connecting 54 web server 34 (shown in FIG. 1) to ACM CPU 18 (shown in FIG. 1). Web server 34 receives 56 HTTP requests from network 28 (shown in FIG. 1) and processes 58 the HTTP requests. In one embodiment, web server 34 processes 58 the HTTP requests, reads 60 at least one web page file (not shown), parses 62 the web page file for tag functions, uses form data from the HTTP request to transfer 64 ACM data to ACM CPU 18 to control operation of eWeb ACM 12, embeds 66 the status of the tag function within the at least one web page file, and sends 68 the at least one web page file through network 28. In another embodiment, web server 34 processes 58 the HTTP requests, reads 60 at least one web page file from database 32, requests 70 ACM data from ACM CPU 18 based on parsing the web page file for tag functions and applying form data from the HTTP request, and receives 72 ACM data from ACM CPU 18. Further, web server 34 embeds 74 the received ACM data within the at least one web page file and sends 68 the at least one web page file through network 28.

Figure 3:
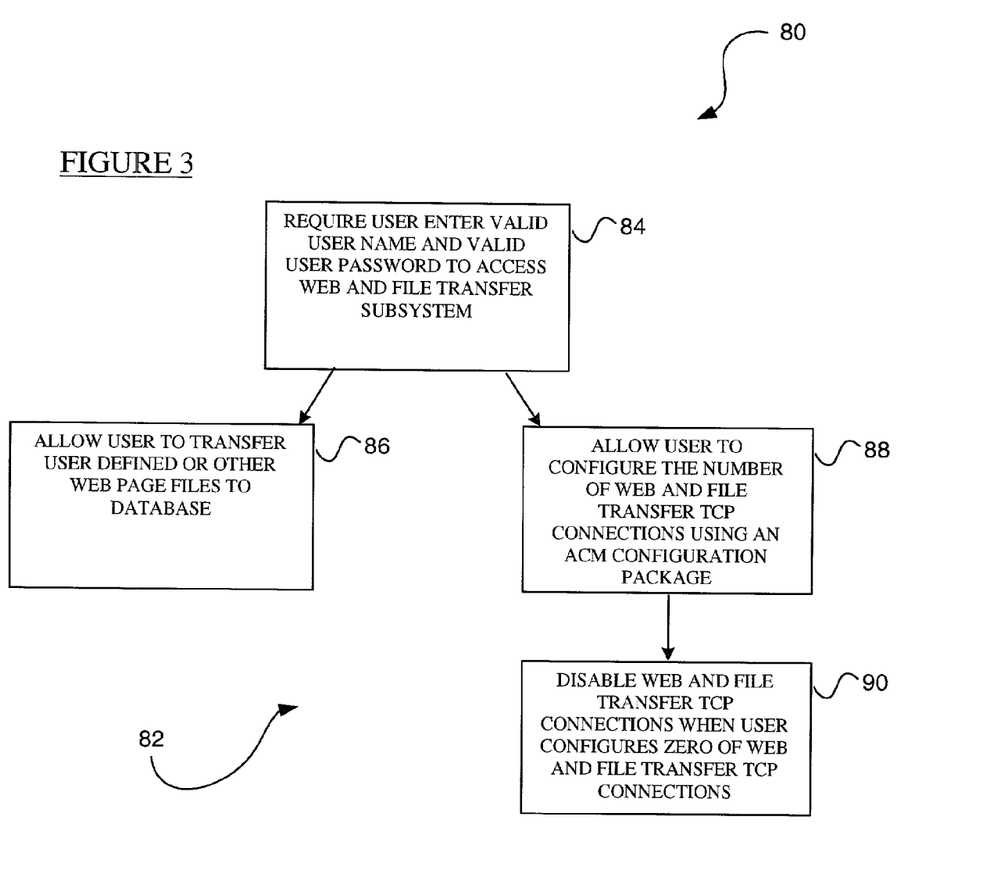
FIG. 3 is a flow chart illustrating another embodiment of a method for management and control of an automation control module using an ACM system.

FIG. 3 is a flow chart 80 illustrating a method 82 for management and control of eWeb ACM 12 (shown in FIG. 1) using ACM system 10 (shown in FIG. 1). Method 82 includes requiring 84 user 30 to input a valid user name and valid user password to access web and file transfer subsystem 14 (shown in FIG. 1) and allowing 86 user 30 to transfer user defined or other web page files to database 32. In another embodiment, method 82 includes allowing 88 user 30 to configure the number of web and file transfer TCP connections (not shown) using an ACM configuration package (not shown). The web and file transfer TCP connections are disabled 90 when user 30 configures zero of the web and file transfer TCP connections.

Figure 4:
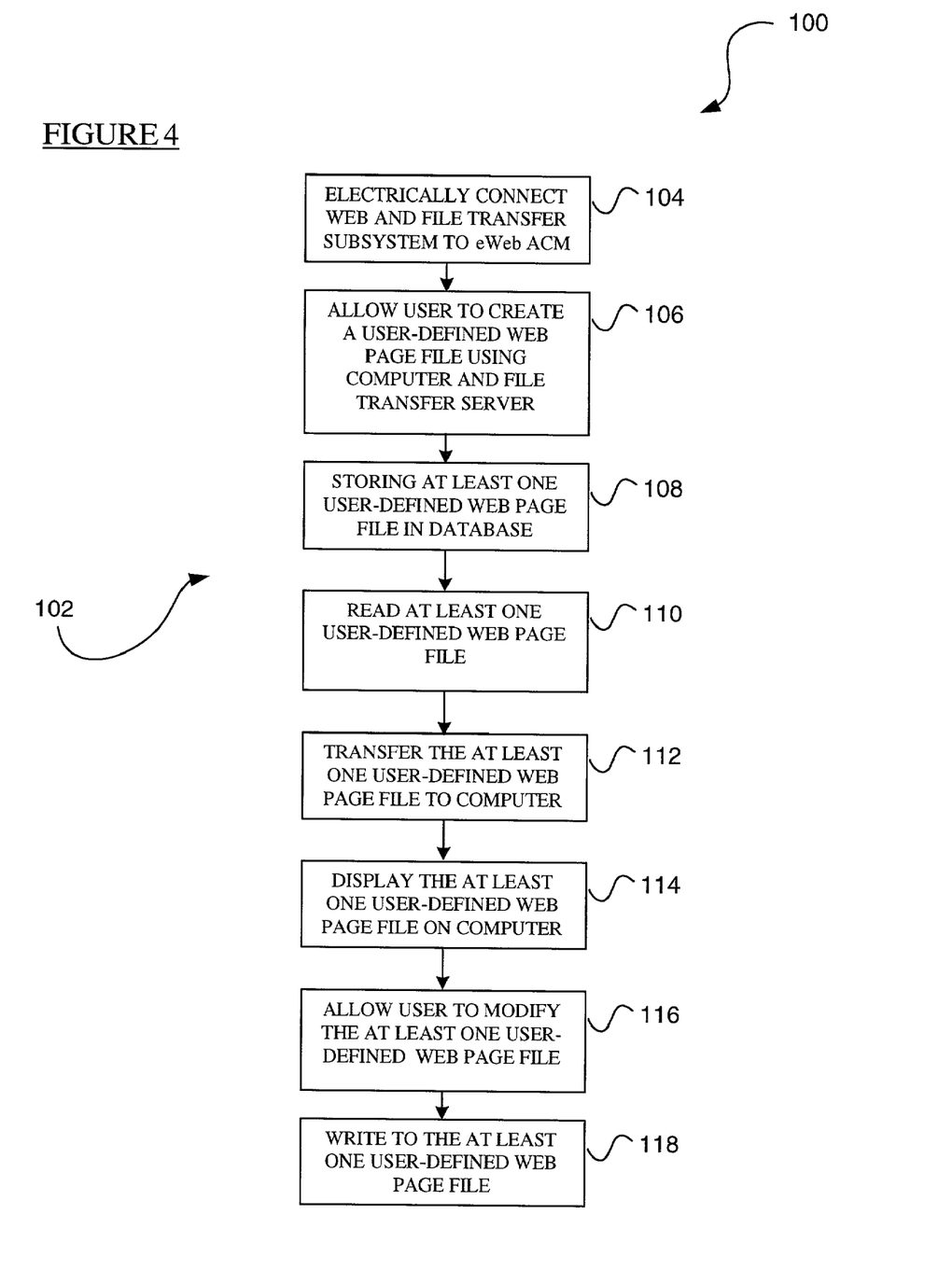
FIG. 4 is a flow chart illustrating another embodiment of a method for management and control of an automation control module using an ACM system.

FIG. 4 is a flow chart 100 illustrating a method 102 for management and control of eWeb ACM 12 (shown in FIG. 1) using ACM system 10 (shown in FIG. 1). Method 102 includes electrically connecting 104 web and file transfer subsystem 14 (shown in FIG. 1) to eWeb ACM 12, allowing 106 user 30 to create a user-defined web page file (not shown) using computer 16 (shown in FIG. 1) and file transfer server 36 (shown in FIG. 1), and storing 108 at least one user-defined web page file in database 32 (shown in FIG. 1). File transfer server 36 reads 110 the at least one user-defined web page file stored in database 32, transfers 112 the at least one user-defined web page file to computer 16, and displays 114 the at least one user-defined web page file on computer 16. Computer 16 and file transfer server 36 allow 116 user 30 to modify the at least one user-defined web page file, and file transfer server 36 writes 118 to the at least one user-defined web page file.

EXAMPLES

Figure 5:
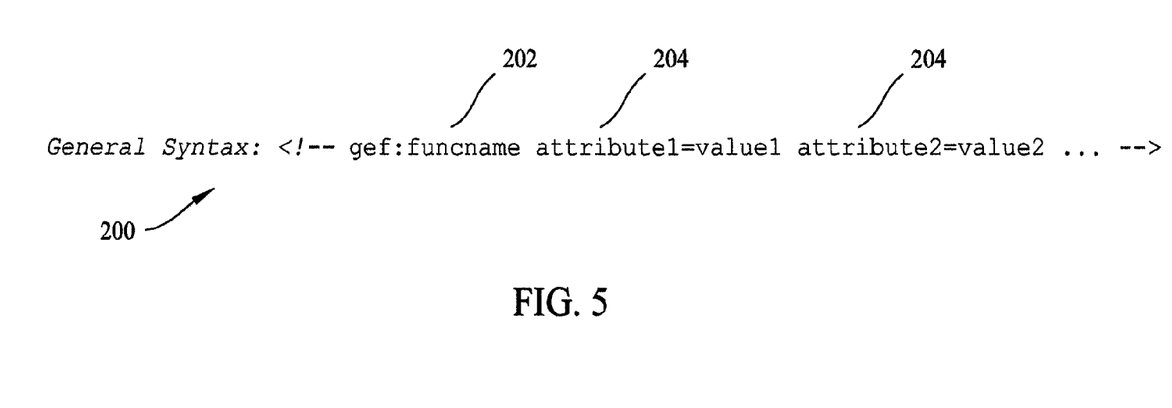
FIG. 5 is an example of an ACM HTML tag comment.

FIG. 5 is an example of an ACM HTML tag comment syntax 200 that includes a specified defined function 202. Tag comment 200 also includes a plurality of attributes 204, which may be function-specific parameters or general attributes, such as data display requirements.

Figure 6:
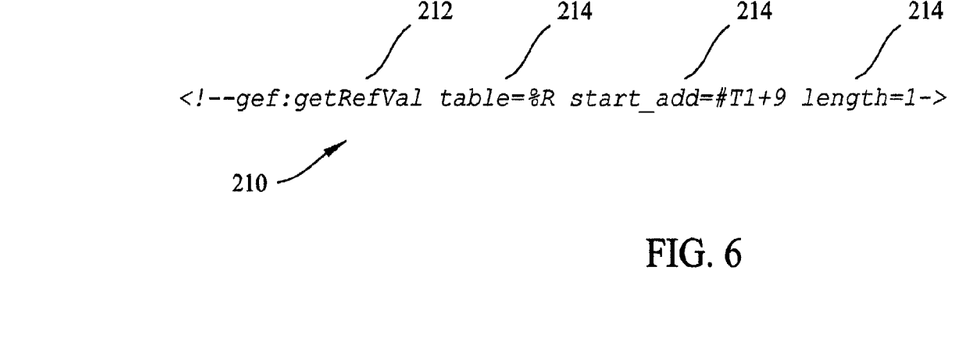
FIG. 6 is an alternative example of an ACM HTML tag comment.

FIG. 6 is an alternative example of an ACM HTML tag comment 210 that includes a specified defined function 212. Tag comment 210 also includes a plurality of attributes 214.

Figure 7:
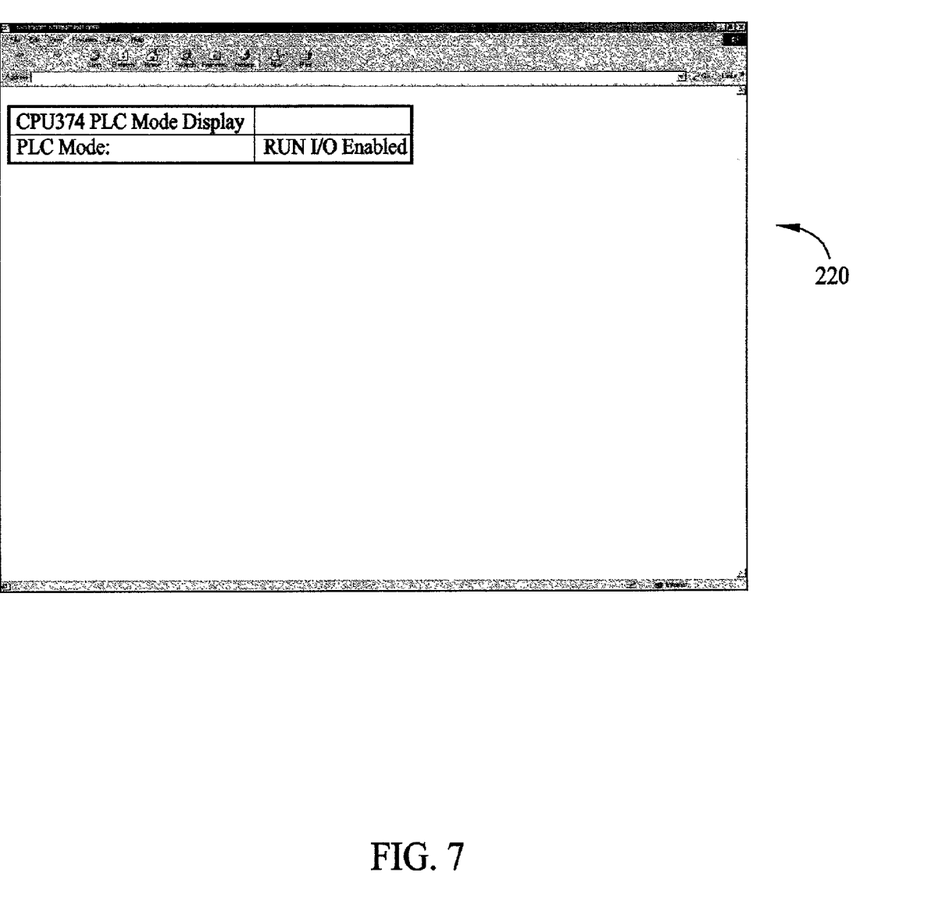
FIG. 7 is an example of an HTML web page for retrieving a mode of the ACM of the present invention using HTML and ACM tag functions.

FIG. 7 is an example of a web page 220 for retrieving a mode of eWeb ACM 12 using HTML and ACM tag functions.

Figure 8:
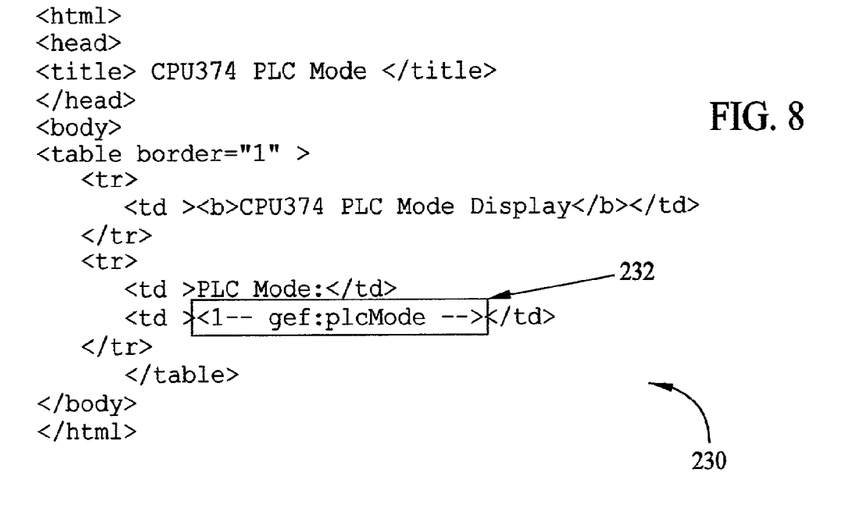
FIG. 8 is the HTML for the web page illustrated in FIG. 6.

FIG. 8 is the HTML 230 for web page 220. HTML 230 includes an ACM tag function 232 that causes web server 34 to retrieve the ACM mode from eWeb ACM 12.

Figure 9:
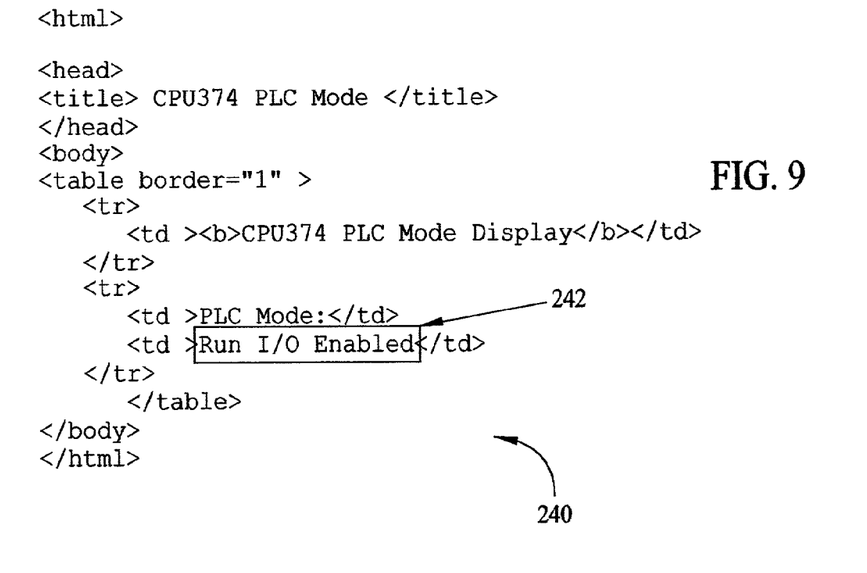
FIG. 9 is an HTML for a web page that displays the ACM mode requested in the HTML illustrated in FIG. 7.

FIG. 9 is an example of an HTML 240 for a web page that displays the ACM mode requested in HTML 230. HTML 240 includes a return string value 242 from tag function 232. HTML 240 does not include the ACM tag information.

Figure 10:
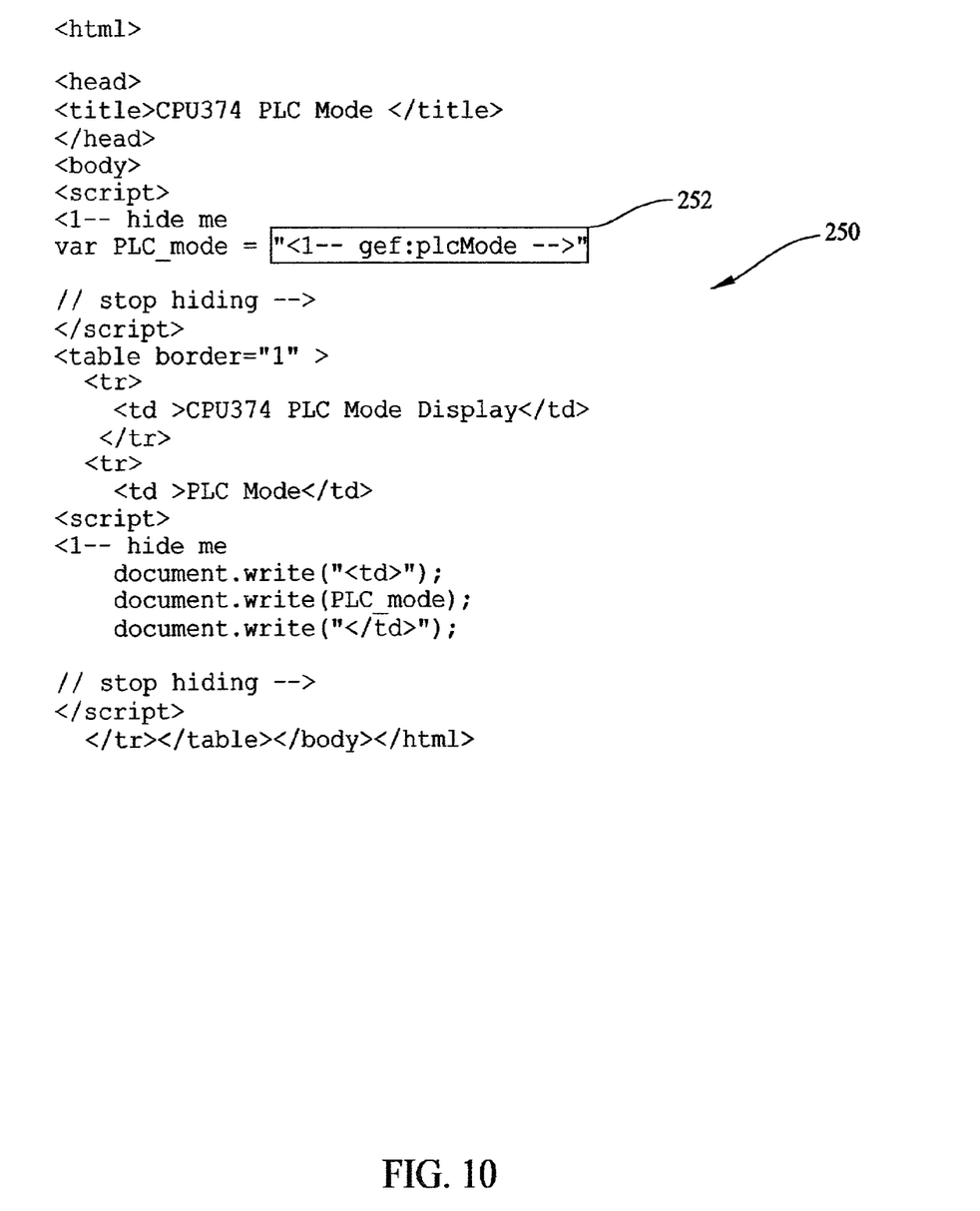
FIG. 10 is an example of an HTML for a web page for retrieving a mode of the ACM of the present invention using HTML, Javascript, and ACM tag functions.

FIG. 10 is an example of an HTML 250 for a web page for retrieving a mode of eWeb ACM 12 using HTML, Javascript, and ACM tag functions. HTML 250 includes an ACM tag function 252 that causes web server 34 to retrieve the mode of eWeb ACM 12.

ACM system 10 provides reduced system hardware costs, rapid development of custom ACM monitoring and control tools that reduce implementation costs, and fast response time accessing ACM data with low impact on other critical real-time ACM functions such as ACM sweep time, thereby reducing production costs. In addition, ACM system 10 facilitates rapid access to ACM data on standard devices such as a web browser on computer 16 or PDA via a standard network.

While the invention has been described in terms of various specific embodiments, those skilled in the art will recognize that the invention can be practiced with modification within the spirit and scope of the claims.

What is claimed is:

1. A web-enabled automation control module (ACM) comprising:
    an ACM central processing unit (CPU);
    an ACM CPU system memory electrically connected to said ACM CPU; and
    a web and file transfer system directly electrically connected, without using a backplane, to said ACM CPU, said web and file transfer system embedded within said ACM, said web and file transfer system comprising a web server, a file transfer server, and a database, said web and file transfer system configured to:
    receive from a network a plurality of user-defined web page files, at least one of the plurality of user-defined web page files comprising at least one ACM tag function that facilitates an exchange of ACM data between said web server and said ACM CPU system memory;
    store the plurality of user-defined web page files in said database;
    receive, from the network, a hypertext transfer protocol (HTTP) request to send a first user-defined web page file of the plurality of user-defined web page files to the network;
    process the HTTP request;
    access the first user-defined web page file referenced in the HTTP request;
    parse the first user-defined web page file for the at least one ACM tag function;
    execute the at least one ACM tag function using form data from the HTTP request to transmit ACM data to said ACM CPU to control operation of said ACM;
    enable a user to configure at least one web and file transfer connection of a plurality of web and file transfer connections; and
    disable the plurality of web and file transfer connections when the user does not configure the at least one web and file transfer connection;
    wherein said ACM is one of a programmable logic controller (PLC), a computer numeric control (CNC), and a motion control product.

2. An ACM in accordance with claim 1 wherein said web server is electrically connected to said ACM CPU and the network, said web server configured to receive the HTTP request from the network and to process the HTTP request from the network.

3. An ACM in accordance with claim 2 wherein said web server is configured to respond to the HTTP request from the network by one of transmitting the first web page file to the network or transferring ACM data to the ACM CPU using form data from the HTTP request.

4. An ACM in accordance with claim 1 wherein said database is electrically connected to said web server, and said web server is configured to read the first user-defined web page file from said database.

5. An ACM in accordance with claim 1 wherein said web server is configured to receive ACM data from said ACM CPU.

6. An ACM in accordance with claim 5 wherein said web server is configured to receive ACM data from said ACM CPU and embed the received ACM data within the first user-defined web page file based on function tags embedded within the first user-defined web page file.

7. An ACM in accordance with claim 1 wherein said web server is configured to transfer ACM data to said ACM CPU.

8. An ACM in accordance with claim 1 wherein said web server is configured to send the first user-defined web page file through the network using HTTP.

9. An ACM in accordance with claim 1 wherein said web and file transfer system further comprises a network interface configured for connection to the network.

10. An ACM in accordance with claim 1 wherein said ACM comprises a backplane interface electrically connected to said ACM and a backplane electrically connected to said backplane interface, said ACM backplane configured for connection with at least one of an input/output (I/O) module and an input module.

11. An ACM in accordance with claim 1 wherein said ACM is in operational control communication with a device.

12. An ACM in accordance with claim 1, wherein said web server is configured to:
    request ACM data from said ACM CPU based on parsing the web page file for tag functions and applying form data from the HTTP request;
    receive ACM data from said ACM CPU;
    embed the received ACM data within at least one web page file; and
    send the at least one web page file to the network.

13. An automation control module (ACM) system comprising:
    a network;
    a web-enabled computer electrically connected to said network; and an ACM electrically connected to said web-enabled computer via said network, wherein said ACM is at least one of a programmable logic controller (PLC), a computer numeric control (CNC), and a motion control product, said ACM comprising an ACM central processing unit (CPU) directly electrically connected to a web and file transfer subsystem without using a backplane, said ACM CPU and said web and file transfer subsystem embedded within said ACM, said web and file transfer subsystem comprising a web server, a file transfer server, and a database, said web and file transfer subsystem configured to:

receive from said web-enabled computer, via said network, a plurality of user-defined web page files, at least one of said plurality of user-defined web page files comprising at least one ACM tag function that facilitates an exchange of ACM data between said web and file transfer subsystem and said ACM CPU;

store the plurality of user-defined web page files in said database;

receive from said web-enabled computer, via said network, a hypertext transfer protocol (HTTP) request to send a first user-defined web page file of the plurality of user-defined web page files to said web-enabled computer;

process the HTTP request;

access the first user-defined web page file referenced in the HTTP request;

parse the first user-defined web page file for the at least one ACM tag function;

execute the at least one ACM tag function using form data from the HTTP request to transmit ACM data to said ACM CPU to control operation of said ACM;

enable said user to configure at least one web and file transfer TCP connection of a plurality of web and file transfer TCP connections using said computer; and disable said plurality of web and file transfer TCP connections when none of said plurality of web and file transfer TCP connections are configured.

14. An ACM system in accordance with claim 13 wherein said database is electrically connected to said network and said file transfer server.

15. An ACM system in accordance with claim 14 wherein said file transfer server is configured to read and write to the plurality of user-defined web page files stored in said database.

16. An ACM system in accordance with claim 13 wherein said file transfer server configured to transfer the plurality of user-defined web-page files though said network to said computer.

17. An ACM system in accordance with claim 13 wherein said file transfer server configured to allow a user to at least one of create the user-defined web page files and modify the user-defined web page files.

18. An ACM system in accordance with claim 13 wherein at least one of the plurality of user-defined web page files comprises at least one of hypertext markup language (HTML), Javascript, and references to other files.

19. An ACM system in accordance with claim 18 wherein said references to other files comprise at least one of at least one image file and at least one Applet.

20. An ACM system in accordance with claim 13 wherein at least one of the plurality of user-defined web page files comprises at least one ACM tag function.

21. An ACM system in accordance with claim 13 wherein said file transfer server is a file transfer protocol server.

22. An ACM system in accordance with claim 13 wherein said web and file transfer subsystem further comprises a network interface electrically connected to said file transfer server and said network.

23. An ACM system in accordance with claim 13 configured to display at least one of the plurality of user-defined web page files on said computer.

24. An ACM system in accordance with claim 13 wherein a user is required to enter a valid user name and user password to access said ACM system.

25. A method for management and control of an automation control module (ACM) including an ACM central processing unit (CPU), wherein the ACM is one of a programmable logic controller (PLC), a computer numeric control (CNC), and a motion control product, said method comprising:

embedding a web and file transfer system within the ACM including electrically connecting the web and file transfer system directly to the ACM CPU without the use of a backplane, the web and file transfer system includes a web server, a file transfer server, and a database configured to store a user-defined web page file;

electrically connecting the web and file transfer system to a network;

processing a hypertext transfer protocol (HTTP) request message from the network using the web and file transfer system, the HTTP request message comprising a request to send the user-defined web page file to the network;

using form data from the HTTP request message to transfer ACM data to the ACM CPU to control operation of the ACM;

enabling a user to configure at least one web and file transfer connection of a plurality of web and file transfer connections; and disabling the plurality of web and file transfer connections when the user does not configure the at least one web and file transfer connection.

26. A method in accordance with claim 25 wherein the web server is electronically connected to the ACM CPU and the network, processing the HTTP request message from the network using the web and file transfer system comprises processing the HTTP request message from the network using the web server.

27. A method in accordance with claim 26 wherein processing the HTTP request message from the network using the web server comprises:

receiving the HTTP request message from the network using the web server; and responding to the HTTP request message using the web server.

28. A method in accordance with claim 26 wherein the database is electrically connected to the web server, processing the HTTP request message from the network using the web server comprises:

receiving the HTTP request message from the network;

reading the user-defined web page file from the database, the user-defined web page file referenced in the HTTP request message;

requesting the ACM data from the ACM CPU via function tags embedded within the user-defined web page file;

receiving the ACM data from the ACM CPU;

embedding the ACM data within the user-defined web page file; and sending the user-defined web page file through the network.

29. A method in accordance with claim 28 wherein the database includes at least one user name and at least one user password, the network includes at least one computer electrically connected to the network, said method further comprising requiring a user input a valid user name and valid user password into the computer to access the web and file transfer system.

30. A method in accordance with claim 26 wherein processing the HTTP request message from the network using the web server comprises transferring ACM data to the ACM CPU using the web server as directed by function tags embedded within the user-defined web page file and by form data contained in the HTTP request message.

31. A method in accordance with claim 25 wherein the file transfer server is electrically connected to the database and the network, said method further comprising:
   storing the user-defined web page file in the database;
   reading the user-defined web page file using the file transfer server and the network;
   and writing to the user-defined web page file using the file transfer server and the network.

32. A method for management and control of an automation control module (ACM) using an ACM system, the ACM system including a network, a web-enabled computer electrically connected to the network, and the ACM electrically connected to the web-enabled computer via the network, the ACM comprising an ACM central processing unit (CPU), wherein the ACM is one of a programmable logic controller (PLC), a computer numeric control (CNC), and a motion control product, said method comprising:
   embedding a web and file transfer subsystem within the ACM including directly electrically connecting the web and file transfer subsystem to the ACM CPU without the use of a backplane, the web and file transfer subsystem includes a web server, a file transfer server, and a database;
   storing at least one user-defined web page file in the database, the at least one user-defined web page file comprising at least one ACM tag function that facilitates an exchange of ACM data between the web and file transfer subsystem and the ACM CPU;
   processing a hypertext transfer protocol (HTTP) request from the network;
   executing the at least one ACM tag function using form data from the HTTP request to transfer ACM data to the ACM CPU to control operation of the ACM;
   enabling a user to configure at least one web and file transfer connection of a plurality of web and file transfer connections; and
   disabling the plurality of web and file transfer connections when the user does not configure the at least one web and file transfer connection.

33. A method in accordance with claim 32 further comprising:
   reading the at least one user-defined web page file stored in the database using the file transfer server; and
   writing to the at least one user-defined web page file stored in the database using the file transfer server.

34. A method in accordance with claim 33 wherein reading the at least one user-defined web page file stored in the database using the file transfer server further comprises:
   transferring the at least one user-defined web page file to the computer; and
   displaying the at least one user-defined web page file on the computer using the file transfer server.

35. A method in accordance with claim 33 wherein writing to the at least one user-defined web page file stored in the database using the file transfer server comprises allowing a user to modify the at least one user-defined web page file using the computer and the file transfer server.

36. A method in accordance with claim 32 further comprising allowing a user to create a user-defined web page file using the computer and the file transfer server.

37. A method in accordance with claim 32 wherein processing the HTTP request from the network comprises processing the HTTP request from the computer using the web server.

38. A method in accordance with claim 32 wherein the database includes at least one user name and at least one user password, said method further comprising requiring a user input a valid user name and valid user password into the computer to access the web and file transfer subsystem.

* * * * *